June 14, 1938.  F. S. HODGMAN  2,120,951
STEERING REPEATER COMPASS
Original Filed April 13, 1935   2 Sheets-Sheet 1
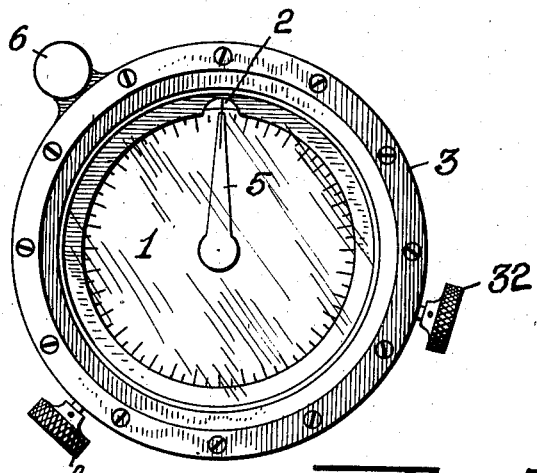
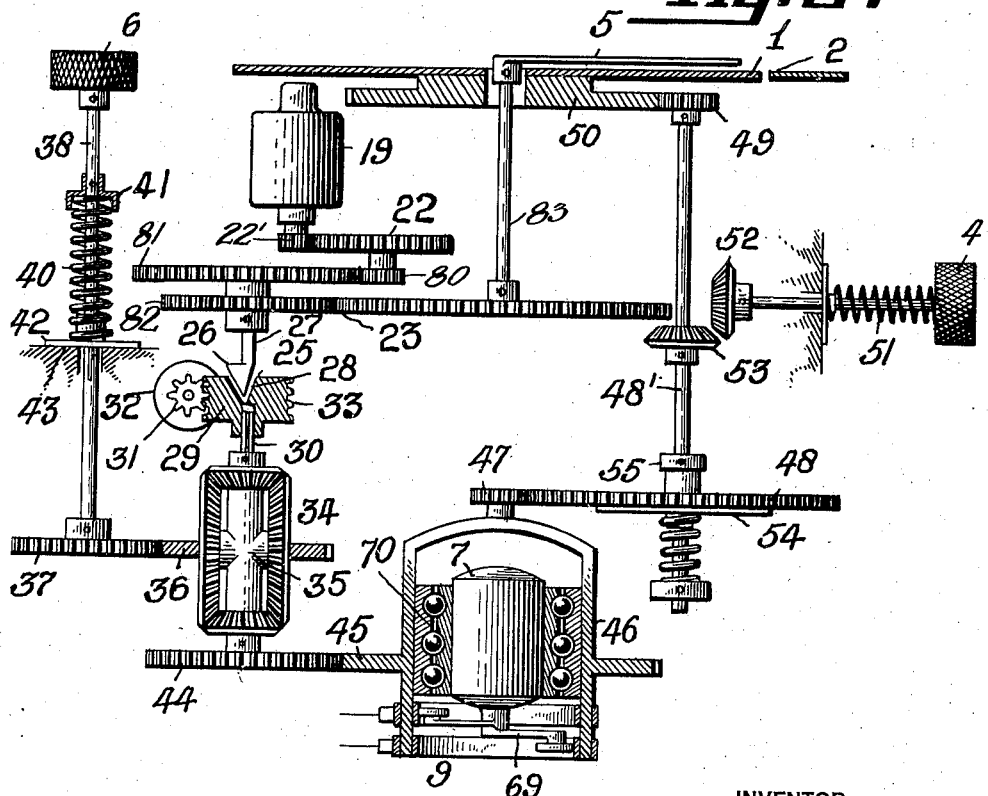
INVENTOR
FREDERICK S. HODGMAN
BY
HIS ATTORNEY.

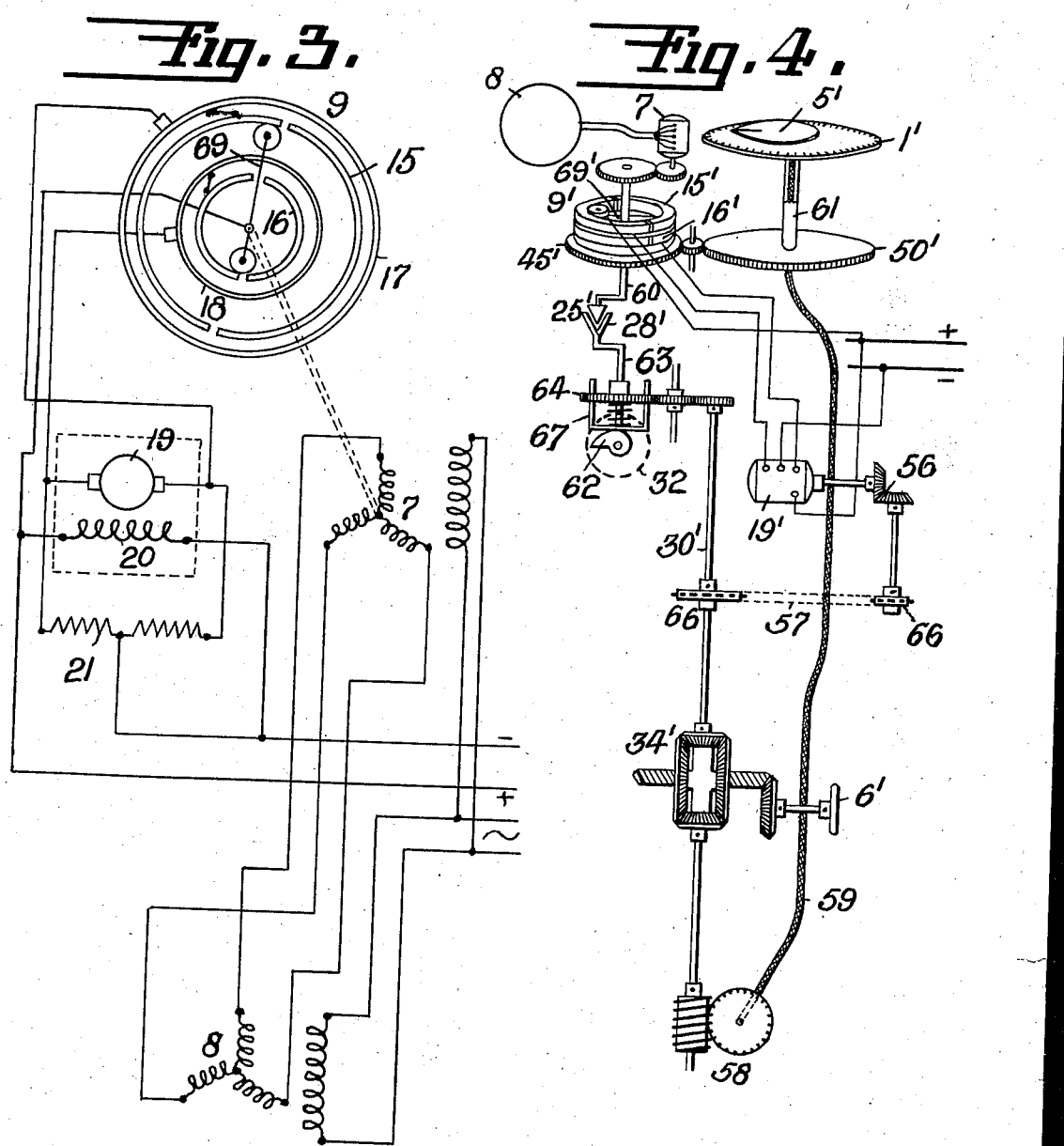

Patented June 14, 1938

2,120,951

UNITED STATES PATENT OFFICE 2,120,951

STEERING REPEATER COMPASS

Frederick S. Hodgman, Glen Rock, N. J., assignor to Sperry Gyroscope Company, Inc., Brooklyn, N. Y., a corporation of New York Original application April 13, 1935, Serial No. 16,173. Divided and this application December 31, 1936, Serial No. 118,495. In Japan April 7, 1936

8 Claims. (Cl. 177—351)

This invention relates to repeater compasses such as now used for the steering of ships in connection with a master compass, such as a gyroscopic compass.

The gyroscopic compass has now become an instrument of great precision, so that changes of course of a minute in azimuth or less may be detected. It is, however, difficult for the helmsman to see such a small change on an ordinary repeater card and several types of multiple dials have been proposed, including an auxiliary or fine card driven at 36 to 1 ratio. Such a card, however, is difficult for the average helmsman to follow.

According to my invention, I propose to retain the advantages of the single 360° card which rotates once for a complete turn of the ship, but to show thereon in readable or magnified form a very small change in the heading of the ship.

I obtain this improved result by employing a course indicating pointer in addition to the ordinary compass card and by driving the compass card by the so-called fine or 36:1 or 180:1 repeater motor instead of the 1:1 motor, with, however, proper reduction gearing therebetween. The card, therefore, will actually show a very small change of course, say one minute of arc, but such a small movement at the periphery of the compass card would not be noticeable by the helmsman, being on the order of only .001 inch. In order that the helmsman may detect the initial slight departure of the ship from the course and to give him immediate warning that the vessel has commenced to yaw in a new direction, I connect the pointer referred to above to the card or motor through a lost motion device in such a fashion that it will move through an initial angle of sufficient size to be readily noted by the helmsman.

My invention has especial application to a repeater compass used in connection with an automatic steering gear for ships and, in fact, is shown in my prior application for Letters Patent, Serial No. 16,173, filed April 13, 1935, for Automatic steering for ships. The present application is therefore a division of my aforesaid prior application.

Referring to the drawings showing one form my invention may assume.

Fig. 1 is a plan view of my improved form of steering repeater compass.

Fig. 2 is a diagrammatic view, partly in section, showing the elements of my invention.

Fig. 3 is a wiring diagram of the same.

Fig. 4 is a diagram showing the invention in the form it is shown in my aforesaid application.

As shown in Fig. 1, my improved steering repeater may have the appearance of an ordinary repeater compass with the usual 360° compass card 1, lubber line 2, casing 3, and setting knob 4 for setting the card. In addition, however, I provide a course indicating pointer 5 which may be set on any desired course by means of an auxiliary setting knob 6, so that it may always be kept on the lubber line 2. The compass card is controlled primarily from a repeater motor 7 which is preferably driven from a multiple speed selsyn transmitter 8 on the gyro compass, this being usually driven at a 36:1 ratio. The motor, however, is not geared directly to the card, but operates one portion of a two-part follow-up controller 9. As shown, the motor 7 is directly connected to the trolley or revolving brush arm 69 of the controller.

The controller is shown as provided with two split rings 15 and 16, half of each of which is dead and the live halves are connected respectively to collector rings 17 and 18. The controller controls a power or servo motor 19 which is shown as of the direct current type, having a shunt field winding 20 connected directly across the supply and a mid-tap resistance 21 connected across the armature, the center tap being connected to one side of the line. It will readily be seen that the motor will be driven in either direction, depending upon whether the trolleys are on the live section of ring 15 or ring 16, and that in the standstill position the motor is instantly brought to rest by dynamic braking.

The power motor is shown as geared directly, through motor shaft pinion 22', reduction gears 22 and 80, gears 81 and 82 on shaft 27, to the large gear 23 on the shaft 83 of course pointer 5. There is interposed between said motor and the controller rings,—in other words, in the follow-up connection between the motor and controller rings—a lost motion connection 25. Said connection is preferably adjustable so that the amount of lost motion, and thereby the amount of initial throw of pointer 5, may be varied to suit the navigator. As shown, there is provided an eccentric cone 26 on the end of shaft 27, which partially enters a conical depression 28 in a circular block 29 slidably but non-rotatably mounted on shaft 30. Said block may be raised and lowered to vary the amount of lost motion, as by means of a pinion 31 turned from a knob 32 and meshing with circular rack teeth 33 on the periphery of said block.

The motor thus drives the shaft 30, which is shown as forming one arm of a differential gear train 34. The center arm 35 of said train is normally held stationary by means of intermeshing gears 36 and 37, but may be turned from the pointer setting knob 6 mounted on shaft 38 of gear 37. A friction drag is placed on shaft 38 so as to hold the middle arm of the differential normally stationary. This is shown as provided by a spring 40 between a collar 41 fixed on shaft 38, and a collar 42, slidably but non-rotatably mounted on the shaft 37 and normally pressed against the fixed abutment 43. The third arm of the differential rotates gear 44, meshing with an annular gear 45 secured to the sleeve 46, which carries the contactor and slip rings of the controller 9, said sleeve being shown as journaled on the exterior of the casing of the motor 7 by a long bearing 70. Sleeve member 46 is shown as having a pinion 47 thereon driving a gear 48 on shaft 48', which also carries a pinion 49 driving a large gear 50, to the hub of which the compass card 1 is secured.

The gear 48 is preferably not rigidly fixed to the shaft 48', however, but has a slip friction connection therewith, so that the compass card may be manually synchronized with the master compass. For this purpose, setting knob 4, which is normally held in its inoperative or outward position by spring 51, when pushed in, brings into mesh the bevel gear 52 on the shaft thereof, and bevel gear 53 on the shaft 48', so that by turning the knob, the compass card may be set without displacing the controller. The slip friction connection for gear 48 is shown as provided by a spring pressed clutch face 54, slidably but non-rotatably secured to the shaft 48', which presses against the face of the gear 48, which is held in place by collar 55.

In Fig. 4, the parts have been numbered similarly to Fig. 2, with primed numbers, so that the corresponding parts will be readily recognized, and while the arrangement appears to be different, the operation is the same.

In this case, the selsyn repeater 7 is shown as geared to the trolley arm 69' of the controller 9', and the power motor 19' is shown as connected to the shaft 30' of the differential 34' through gearing 56, sprockets 66 and chain drive 57. In this case, the third arm of the differential 34' drives the course pointer 5' through helical gearing 58 and flexible shaft 59.

The lost motion device 25' may be similar to that described in connection with Fig. 2 and is shown as placed between the shaft 30' and the shaft 60 of the gear 45', on which is mounted the controller rings 15' and 16', said gear also driving the large gear 50' which rotates the sleeve 61 carrying the compass card 1'. In this case, the variation in the amount of lost motion is shown as effected from a cam 62 which raises and lowers a shaft 63, which carries the hollow cone 28' on the lost motion device, the shaft 63 being slidably but non-rotatably mounted within the hub of the gear 64 by means of fork 67.

It will readily be seen that in both forms of my invention the course pointer 5 or 5' will be given an initial movement whenever the ship changes its direction of yaw, so as to give the helmsman immediate warning that the ship is starting to yaw in a different direction. This is due to the fact that there is a lost motion connection in both instances between the power motor and its controller, so that the motor must turn enough to take up this lost motion when it starts to turn in a different direction from that in which it has previously been turning, and this initial movement is transmitted to the course pointer 5, but it is not transmitted to the compass card. The compass card therefore remains extremely accurate in its indications.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Thus, where the repeater motor 7 has sufficient power, that is, where it is of the D. C. step-by-step type instead of the A. C. self-synchronous type, it is obvious that the shaft thereof may be geared through the reduction gearing shown to the card 1 instead of, or in addition to, driving said card from the power motor 19. This will not in any way alter the operation of the pointer 5, which will continue to give magnified indications in case of change of the direction of yaw of the ship.

Having described my invention, what I claim and desire to secure by Letters Patent is:

1. In a steering repeater compass, a repeater compass card, an auxiliary course indicator mounted concentric therewith, a compass repeater motor, a reversing controller actuated by said motor, a reversible power motor governed by said controller and driving said course indicator, a follow back drive from said power motor to said controller including a lost motion device, and means for driving said compass card also from said follow back drive and lost motion device.

2. In a steering repeater compass, a repeater compass card, an auxiliary course indicator mounted for conjoint reading with said card, a compass repeater motor adapted to be rotated a multiple number of times for each complete turn of the ship, a source of power, a reversing controller actuated by said motor, a reversible power motor operated from said controller and source of power, driving said course indicator through reduction gearing, a follow back drive from said power motor to said controller including a lost motion device, and means for driving said compass card from said follow back drive, lost motion device and reduction gearing.

3. In a steering repeater compass, a repeater motor adapted to be rotated from a master compass, a reversing controller directly connected to said motor, a follow-up part on said controller, a compass card driven thereby, a reversible motor governed by said controller and driving said follow-up part, a course indicator also driven by said reversible motor and mounted for joint reading with said card, and means for giving said indicator an initial extra movement not given the card upon a change in the direction of yaw of the ship.

4. A steering repeater compass for ships having two movable indicating elements, one of which is a compass card and both of which normally make one complete revolution per complete turn of the ship, and means for imparting to only one of said elements an initial magnified throw upon a change in the direction of yaw of the ship.

5. A steering repeater compass for ships having two movable indicating elements, one of which is a compass card and both of which make one complete revolution per complete turn of the ship, means for setting the other of said elements to show the ship's course, and means for imparting to said last named element an initial magnified movement upon initial deviation of the ship from its course.

6. A steering repeater compass as claimed in claim 1, having manual means for setting said course indicator to show any desired course.

7. In a steering repeater compass, a repeater motor normally rotated from a master compass, a compass card rotated in accordance with the movements of said motor, a reversing controller directly connected to said motor, a follow-up part on said controller, a reversible motor governed by said controller and driving said follow-up part, a course indicator also driven by said reversible motor, and means for giving said indicator an initial extra movement not given the card upon a change in the direction of yaw of the ship.

8. In a steering repeater compass, a repeater compass card, a concentric auxiliary course indicator, a compass repeater motor, a reversing controller actuated by said motor, a reversible power motor governed from said controller and driving said course indicator, and a follow back drive from said power motor to said controller including a lost motion device.

FREDERICK S. HODGMAN.